US005812943A

United States Patent [19]

Suzuki et al.

[11] Patent Number: 5,812,943

[45] Date of Patent: Sep. 22, 1998

[54] HIGH FREQUENCY BAND HIGH TEMPERATURE SUPERCONDUCTOR MIXER ANTENNA WHICH ALLOWS A SUPERCONDUCTOR FEED LINE TO BE USED IN A LOW FREQUENCY REGION

[75] Inventors: Katsumi Suzuki; Youichi Enomoto; Shoji Tanaka, all of Tokyo, Japan

[73] Assignees: NEC Corporation; International Superconductivity Technology Center, both of Tokyo, Japan

[21] Appl. No.: 706,800

[22] Filed: Sep. 3, 1996

[30] Foreign Application Priority Data

Sep. 1, 1995 [JP] Japan .................................... 7-225035

[51] Int. Cl.[6] ........................................................ H04B 1/26

[52] U.S. Cl. .......................... 455/333; 455/293; 455/323; 505/202; 505/204; 343/895

[58] Field of Search .................................... 455/293, 323, 455/326, 327, 330, 280, 291; 343/792.5, 895; 505/201, 202, 204, 293

[56] References Cited

U.S. PATENT DOCUMENTS

| | | | |
|---|---|---|---|
| 4,610,032 | 9/1986 | Miller et al. | 455/325 |
| 5,115,217 | 5/1992 | McGrath et al. | 455/327 |
| 5,280,649 | 1/1994 | Riebman | 455/330 |
| 5,339,457 | 8/1994 | Kawasaki et al. | 455/333 |
| 5,493,719 | 2/1996 | Smith et al. | 505/202 |
| 5,621,422 | 4/1997 | Wang | 343/895 |
| 5,640,170 | 6/1997 | Anderson | 343/895 |

FOREIGN PATENT DOCUMENTS 7-122927 5/1995 Japan .

OTHER PUBLICATIONS

H. Piel et al., “High Temperature Superconductors in High Frequency Fields–Fundamentals and Appns”, *Proc. of the 4th Int’l Symposium on Superconductivity, ISS ’91,* Oct. 1991, Tokyo, pp. 925–930.

A. Balasubramaniyan et al., “An Eight MESFET Periodic Spatial Power Combiner”, *Microwave Symposium Digest, IEEE MTT–S Digest,* 1993, pp. 611–614.

L.L. Lewis et al., “Performance of TlCaBaCuO 30 GHZ 64 Element Antenna Array”, *IEEE Transaction on Applied Superconductivity,* vol. 3, No. 1, Mar. 1993, pp. 2844–2847.

S. K. Banerjee et al., “An X–Band Phased Array Microwave/Photonic Beamforming Network”, *Microwave Symposium Digest, IEEE MTT–S Digest,* 1992, pp. 505–508.

Handbook of Microwave and Optical Components, A Wiley– Interscience Publication, p. 653.

*Primary Examiner*—Edward F. Urban

*Attorney, Agent, or Firm*—Sughrue, Mion, Zinn, Macpeak & Seas, PLLC

[57] ABSTRACT

The invention provides a wide frequency band high temperature superconductor mixer antenna which allows a superconductor feed line, which exhibits a high resistance loss in a high frequency region, to be used in a low frequency region with a low loss and which is provided with a same structure as a mixer which has a wide band twice or more the frequency of a millimeter or more wave while keeping a characteristic of a high integration array antenna, which makes most of the high integrity of superconductor feed lines. The wide frequency band high temperature superconductor mixer antenna includes one or a plurality of planar structure antenna patterns of the log-periodical type or the log-spiral type and a plurality of oxide superconductor thin film feed line wiring patterns formed on a same face of a main surface of a substrate, a central portion of each of the planar structure antenna patterns being formed from an oxide superconductor thin film on which a non-linear element part is provided.

18 Claims, 8 Drawing Sheets

HIGH FREQUENCY BAND HIGH TEMPERATURE SUPERCONDUCTOR MIXER ANTENNA WHICH ALLOWS A SUPERCONDUCTOR FEED LINE TO BE USED IN A LOW FREQUENCY REGION

BACKGROUND OF THE INVENTION

1. Field of the Invention

This invention relates to a mixer antenna which includes a non-linear element, which operates at a temperature lower than the temperature of liquid nitrogen, in units of an element of the antenna and has a frequency converting function (mixer) in a wide-band frequency region wider than twice the frequency of a millimeter, or more.

2. Description of the Related Art

A technique which makes use of a low resistance of the superconductor is important in application of the superconductor to electronic devices. Although the superconductor has a zero dc resistance and has a lower resistance than the normal conductor, the high frequency resistance of the superconductor is not always advantageous when compared with the normal conductor. This is because the high frequency resistance of the superconductor increases in proportion to the square of the frequency while the high frequency, resistance of the normal conductor increases only in proportion to the square root of the frequency.

In a high frequency region, particularly in a frequency region higher than several tens GHz or more, a superconductor transmission line has a very high resistance and accordingly, a special expedient is required for circuit configuration (H. Piel, H. Chaloupka and G. Muller, Proceeding of the 4th International Symposium on Superconductivity, ISS' 91, October 1991, Tokyo, p.925).

In a patch array antenna, thin and long feed lines are used in order to introduce electromagnetic waves received by patches, which are antenna elements, to a signal detector. However, as the number of patches increases, the total length of the feed lines increases, resulting in an increase in resistance of the feed lines. Therefore, the signal intensity at the signal detector does not increase in proportion to the increased number of patches, and an effect desired by the arrangement of the patches in an array is not achieved. Thus, various proposals have been made to introduce signals received by an antenna in a high intensity to a signal detector such as a semiconductor amplifier provided intermediately of each feed line, or each feed line formed from a superconductor or optical cable having a low loss.

For example, a countermeasure wherein eight semiconductor amplifiers are provided intermediately in each feed line (A. Balasubramaniyan, J. Heinbockel and A. Mortazawi, Microwave Symposium Digest, IEEE MTT-S Digest, 1993, p.611) and another countermeasure wherein each feed line part is formed from a superconductor cable (L. L. Lewis et al., IEEE Transaction on Applied Superconductivity, Vol. 3, No. 1, March 1993, p.2844) or from an optical cable (S. K. Banerjee et al., Microwave Symposium Digest, IEEE MTT-S Digest, 1993, p.505) have been proposed.

By the way, it is considered technically very difficult to make a large number of semiconductor amplifiers up to several tens or several hundreds except a superconductor in an array antenna. Further, it is known that, as described above, where the frequency is very high (around or beyond 100 GHz), even where a superconductor is employed, the resistance of each feed line becomes equal to, or worse than that of, the normal conductor, and the advantage of the countermeasure, wherein each feed line is made of a superconductor, is lost.

Thus, the inventors of the present invention have proposed in the invention of an array antenna and a method of producing the array antenna in Japanese Patent Laid-Open Application No. Heisei 7-122927 to provide a superconductive mixer in the proximity of a patch antenna so that most of each feed line conducts only an intermediate frequency (IF), that is, low frequency components, so that the advantage of the countermeasure wherein each feed line is made of a superconductor may not be lost.

Usually, a semiconductor mixer requires a power of a local reference frequency (LO) of plus 10 dBm or more. However, where an oxide high temperature superconductive mixer having the structure disclosed in Japanese Patent Laid-Open Application No. Heisei 7-122927 is used, only a local reference frequency (LO) power of minus 10 dBm or less is required, and consequently, the required LO power can be introduced from an antenna similarly to that with a signal high frequency (RF). In the structure disclosed in Japanese Patent Laid-Open Application No. Heisei 7-122927, since the antenna is of the patch type, where both LO and RF electric waves are received by the patch antenna, the frequencies of both LO and RF electric waves must be close to each other.

The reason is that the patch antenna is an antenna of the type which operates effectively only in the proximity of a resonance frequency which depends upon the configuration of the antenna. When it is desired to displace the LO frequency from the RF frequency, for example, when it is desired to cause the patch antenna to operate as a harmonic mixer, a high frequency line for the LO must be provided on a main substrate surface which constitutes a mixer in order to introduce the LO frequency power to a non-linear element part which constitutes the mixer.

Where an antenna and a mixer are provided on the same main substrate surface, it is very difficult to form high frequency lines for the LO, RF and IF independently of each other. Therefore, even in an ordinary case wherein an antenna and a mixer are not provided on the same main substrate surface, the high frequency line for the LO in most cases serves also as part of the high frequency line for the RF or the IF. Where the high frequency line for the LO serves also as part of the high frequency line for the RF or the IF, if the LO frequency is close to one of the RF frequency and the IF frequency, then it is easy to perform pattern designing for the two frequencies which both use the high frequency path. However, in the following cases, it is very difficult for the high frequency line for the LO to serve as part of the high frequency line for the RF or the IF.

First in a basic wave mixer operation wherein the RF and the LO are substantially equal frequencies, where the RF is a high frequency higher than that of a millimeter wave, also the LO is also a high frequency higher than that of the millimeter wave, and the line which serves as the high frequency line for the LO is the RF line. The line from the antenna to the non-linear element part should be made short to the utmost so that a signal may not be attenuated by a surface leak or the like. Assurance of a space for coupling between the RF line and the LO line deteriorates the performance.

second in a harmonic mixer which employs a LO frequency which is equal to a fraction of the RF frequency, the IF line which can be designed comparatively readily is used commonly with the LO line rather than the RF line which cannot be designed readily. Where a single non-linear element part is involved, it is only required to provide a line which passes both of the IF frequency and the LO frequency therethrough, which is comparatively easy. However, where a plurality of non-linear element parts are involved, it is required to take a phase condition into consideration for both of the IF and the LO, and consequently, in addition to the increase in number of non-linear element parts, it becomes progressively difficult to design the harmonic mixer in the condition of a limited space.

One of conventional examples of a wide frequency band high temperature superconductor mixer antenna which solves the first and the second difficulty simultaneously is an example wherein the feed-line part is made of a superconductor (L. L. Lewis et al., IEEE Transaction on Applied Superconductivity, Vol. 3, No. 1, March 1993, p.2844). This conventional example is described below.

An oxide high temperature superconductor thin film made of TlCaBaCuO is provided on a 2-inch LaAlO3 substrate and patterned to form a patch part and a feed line part.

Gold (Au) is provided as a ground face on the rear face side of the substrate. 8×8=64 patches are arranged at distances equal to one half the wavelength in vacuum, and power is synthesized at a location of the feed line length spaced by equal distances from each two patches and then the feed lines power-synthesized in this manner are power-synthesized again at locations of the feed line length spaced by equal distances from the power synthesis points. If this is repeated a total of six times, power received at the patches can be collected to one feed line.

Where the dimensions of the patches were set to 1.35 mm×0.9 mm, the patch array antenna exhibited the highest performance at 31 GHz. In particular, the performance exhibits its maximum in the proximity of a certain frequency, and as the frequency is displaced from the certain frequency, the patch array antenna almost loses its sensitivity. Further, in order to improve the performance in this frequency region, or in order to obtain a patch array antenna of a further high frequency region, the loss of the superconductor feed line must be reduced. In other words, if it is intended to allow a fundamental wave mixer operation of a high frequency higher than that of a millimeter wave, the structure described above has a structural limitation in that the distance from the antenna to the non-linear element or the amplifier is excessively large.

As a second conventional example, an array antenna and a method of producing the array antenna disclosed in Japanese Patent Laid-Open Application No. Heisei 7-122927 mentioned hereinabove are described.

The second conventional example is constructed so that the advantage of the countermeasure wherein each feed line is made of a superconductor may not be lost, and includes a superconductive mixer provided in the proximity of a patch antenna so that only an intermediate frequency (IF), that is, low frequency components are introduced by most parts of the feed line.

Usually, a semiconductor mixer requires a power of a local reference frequency (LO) of plus 10 dBm or more. However, it is disclosed that, where an oxide high temperature superconductive mixer having the structure disclosed in Japanese Patent Laid-Open Application No. Heisei 7-122927 is used, only a local reference frequency (LO) power of minus 10 dBm or less is required, and consequently, the required LO power can be introduced from an antenna similarly to that with a signal high frequency (RF).

In the structure disclosed in Japanese Patent Laid-Open Application No. Heisei 7-122927, since the antenna is of the patch type, where both LO and RF electric waves are received by the patch antenna, the frequencies of both LO and RF electric waves must be close to each other. The reason is that the patch antenna is an antenna of the type which operates effectively only in the proximity of a resonance frequency which depends upon the configuration of the antenna.

When it is desired to displace the LO frequency much from the RF frequency, for example, when it is desired to cause the patch antenna to operate as a harmonic mixer, a high frequency line for the LO must be provided on a main substrate surface which constitutes a mixer in order to introduce the LO frequency power to a non-linear element part which constitutes the mixer.

SUMMARY OF THE INVENTION

It is an object of the present invention to provide a wide frequency band high temperature superconductor mixer antenna which allows a superconductor feed line, which exhibits a high resistance loss in a high frequency region, to be used in a low frequency region and utilizes the superconductor feed line substantially with a low loss and which is provided with a same structure as a mixer which has a wide band twice, or more, the frequency of a millimeter, or more, wave while keeping a characteristic of a high integration array antenna, which makes the most of the high integrity of superconductor feed lines thereby to achieve high functions.

It is another object of the present invention to provide a wide frequency band high temperature super conductor mixer antenna which has a device structure which does not rely upon the frequency and allows reduction of the final cost compared with a conventional wide frequency band high temperature semiconductor mixer antenna which has a design different for each frequency.

The above and other objects, novel features and advantages of the present invention will become apparent from the following description and the appended claims, taken in conjunction with the accompanying drawings.

An outline of various representative ones of various aspects of the present invention disclosed herein is described below.

(1) A wide frequency band high temperature superconductor mixer antenna includes one or a plurality of planar structure antenna patterns of the log-periodical type or the log-spiral type and a plurality of oxide superconductor thin film feed line wiring patterns formed on a same face of a main surface of a substrate, a central portion of each of the planar structure antenna patterns being formed from an oxide superconductor thin film on which a non-linear element part is provided.

(2) A RF electric wave and a LO electric wave received by the planar structure antenna patterns are converted by the non-linear responding parts into signal electromagnetic waves of a low frequency, which are transmitted by the oxide superconductor thin film feed line wiring patterns. The frequency is, when the wide frequency band high temperature mixer antenna acts as a fundamental wave mixer, a difference between the RF frequency and the LO. But when the wide frequency band high temperature mixer antenna acts as an Nth-order harmonic mixer, the frequency is a difference between the RF frequency and N times the LO frequency. In other words, the non-linear element parts serve as frequency conversion means.

(3) The one or plurality of non-linear responding parts have a structure which has a very short normal conductive region, and are formed as non-linear responding portions formed from one or a plurality of superconductive-normal conductive-superconductive (SNS) junctions.

(4) The non-linear element part has a size smaller than one fourth an effective wavelength of the signal high frequency electric wave (RF) and the local reference frequency electric wave (LO) on the main surface of the substrate.

(5) A current introduction terminal is provided on the same face of the main surface of the substrate, and a non-linear element or the non-linear element part functions as a current bias controlling mixer.

(6) The superconductor thin film wiring is an oxide superconductor made of a YBaCuO compound or a NbBaCuO compound.

(7) The superconductor thin film pattern, except a portion at which the non-linear elements or non-linear element set is provided, has a multiple layer film structure which includes a superconductor thin film and a normal conductive metal thin film of gold or the like provided in this order from a location where the superconductor thin film pattern entirely or partly contacts with the main surface of the substrate.

With the measure described above, since the wide frequency band high temperature superconductor mixer antenna is constructed such that a unit pattern, wherein a unit wiring pattern formed from a superconductor thin film wiring pattern is provided on a same face of a main surface of a substrate, and a non-linear element part is formed in the inside of the unit wiring pattern, while an antenna pattern part, which radiates or absorbs a high frequency electromagnetic field, and a signal transmission line (feed line) pattern part are connected to terminals of the non-linear element part, is connected and introduced by one or a plurality of signal transmission line patterns to a signal detector, and the antenna pattern part has a plane structure of the log-periodical type or the log-spiral type so that the antenna pattern part can absorb both a signal high frequency electric wave (RF) and a local reference frequency electric wave (LO), the transmission line (feed line) pattern for the local reference frequency electric wave (LO) is not provided on the same face of the main face of the substrate. Consequently, except for the antenna pattern part and a linear element part on the main surface of-the substrate, high frequency line patterns for the signal high frequency (RF) and the local reference frequency (LO) need not be provided, which not only assures effective utilization of the space but also reduces the requirement for designing the line for the intermediate frequency (IF) and a current introduction terminal, that is, for designing circuits frequencies lower than several GHz or dc circuits.

Further, since the superconductive non-linear element is employed, the upper limit to the RF frequency is several hundreds GHz. Further, since the antenna of the log-periodical type or the log-spiral type is used, the wide frequency band high temperature superconductor mixer antenna can operate in a wide band over an overall region from the upper limit frequency to the lower limit frequency. The lower limit frequency of the antenna of the type specified relies upon an allowable maximum size of the unit antenna pattern on the main surface of the substrate. The upper limit frequency depends upon a surface wave leak rather than the size of a minimum pattern of the antenna pattern part. The structure of the present invention, wherein the non-linear element part is provided adjacent to a part of a small size of the log-periodical type, or the log-spiral type can suppress the surface wave leak to the minimum level and allows an upper limit operation frequency of several hundreds GHz.

Further, since the wide frequency band high temperature superconductor mixer antenna of the present invention can radiate the LO as an electric wave at an angle close to the right angle with respect to the main surface of the substrate through the air or vacuum, even where a plurality of non-linear element parts are located discretely on the main surface of the substrate, the LO can be sent to the non-linear element parts in comparatively uniform phases compared with those where LO lines are provided on the same face of the main surface of the substrate alternatively.

Also the feature that the dielectric constant of the substrate is higher than 1, and the signal wavelength in the LO lines provided on the same face of the main surface of the substrate is shorter than that in the air or vacuum, makes the present invention advantageous in terms of designing.

Further, since electric waves can be introduced to the non-linear element part continuously from microwaves to submillimeter waves and a LO radiation element which can be designed in a spatially independent fashion, the wide frequency band high temperature superconductor mixer antenna of the present invention can operate as a fundamental wave mixer or a harmonic mixer for an RF frequency of any region from microwaves to submillimeter waves by changing only the LO frequency without changing the positions or the sizes of a plurality of antennae or non-linear element parts provided on the main surface of the substrate.

DETAILED DESCRIPTION OF THE PREFERRED EMBODIMENTS

In the following, an embodiment of the present invention is described in detail with reference to the drawings.

Figure 1:
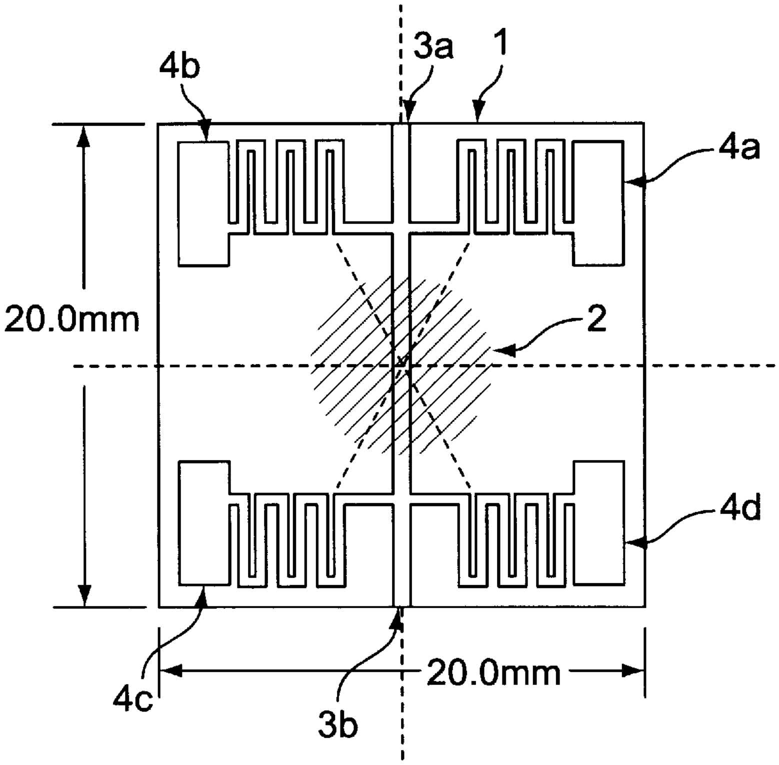
FIG. 1 is a plan view of an entire arrangement showing an example of a circuit provided on a substrate main surface of an embodiment of the present invention.
Figure 2:
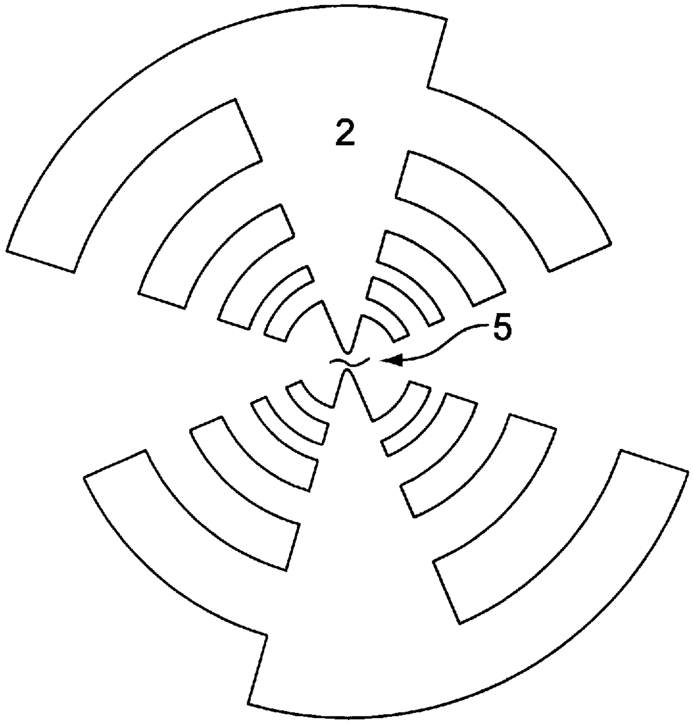
FIG. 2 is an enlarged plan view showing an example of an antenna pattern part provided on the substrate main surface of the embodiment of the present invention.
Figure 3:
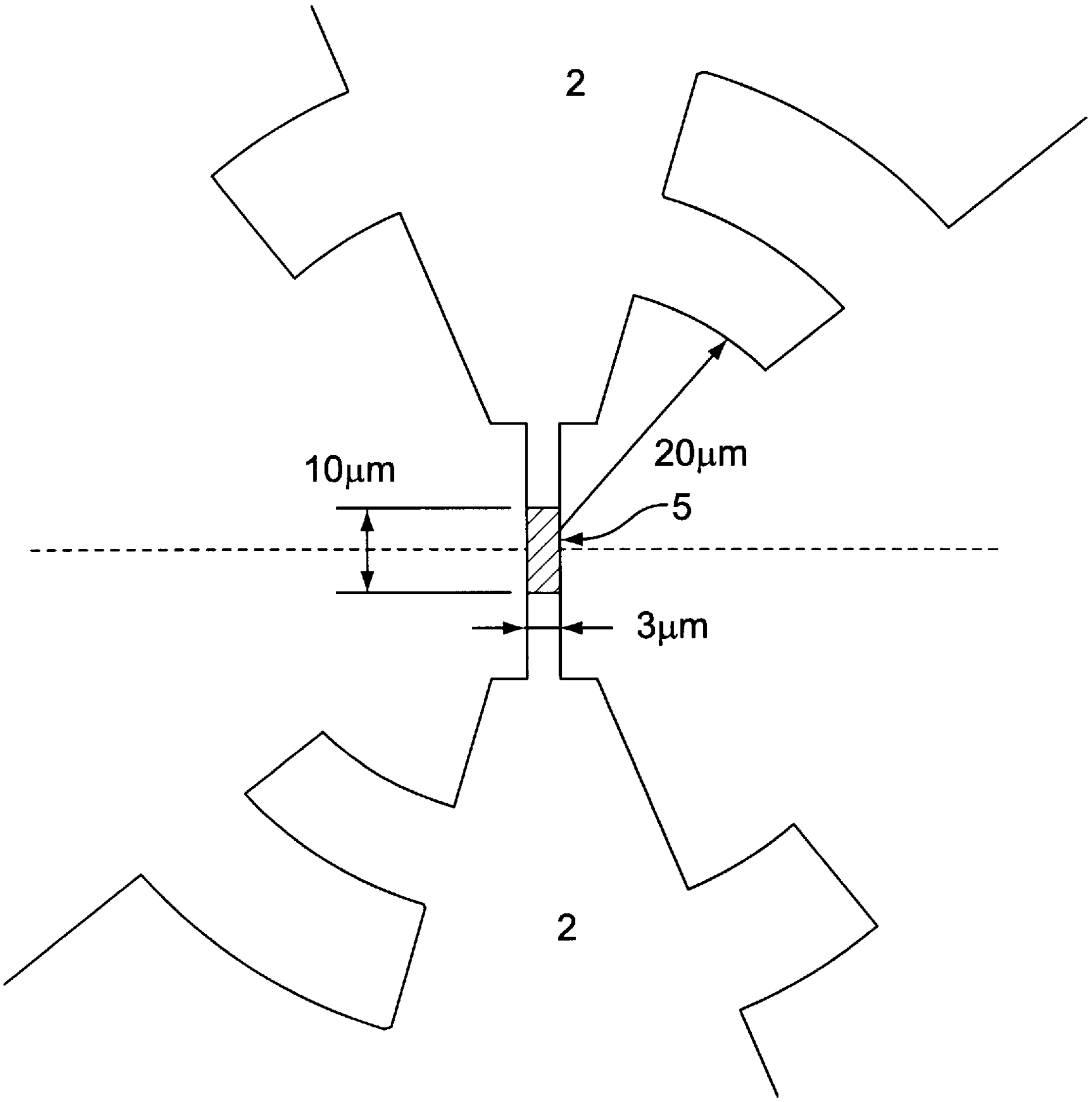
FIG. 3 is a peripheral enlarged plan view of a non-linear element part provided on the substrate main surface of embodiment of the present invention.

FIGS. 1 to 3 are plan views of an embodiment of a wide frequency band high temperature superconductor mixer antenna according to the present invention and are views showing an arrangement of an entire circuit provided on substrate main surface 1 of an example wherein only one unit pattern of a mixer antenna is a component.

Substrate main surface 1 is a MgO substrate whose dielectric constant is approximately 9.7 and has a thickness of 0.5 mm and a magnitude of 20 mm ×20 mm. Antenna pattern part 2, IF output pattern parts 3*a* and 3*b*, and current bias pattern parts 4*a*, 4*b*, 4*c* and 4*d* are provided on substrate main surface 1.

Those elements are all formed from a YBaCuO thin film of an oxide superconductor. The thickness of the superconductor thin film is approximately 2,000 angstrom. The surfaces of all of a peripheral portion of antenna pattern part 2 and IF output pattern parts 3*a* and 3*b* and all patterns of current bias pattern parts 4*a*, 4*b*, 4*c* and 4*d* are covered with gold whose thickness is approximately 1 micron.

FIG. 2 is an enlarged view of antenna pattern part 2. The embodiment shown in FIG. 2 has a log-periodic structure. A theoretical explanation of a wide frequency band antenna of the log-periodic structure or a like structure is given in detail in Kai Chang, HANDBOOK OF MICROWAVE AND OPTICAL COMPONENTS, A Wiley-Interscience Publication, New York.

The sensitivity limitation of the wide frequency band antenna on the low frequency side depends upon the magnitude of antenna pattern part 2. In the present embodiment, the maximum outer radius of the periodical antenna is 3.6 mm and has its low frequency side sensitivity limitation in the proximity of 13 GHz.

Non-linear element part 5 is provided at a central portion of FIG. 2. FIG. 3 is an enlarged view of a peripheral portion around the center of non-linear element part 5.

In the present embodiment wherein substrate main surface 1 is made of MgO whose dielectric constant is approximately 9.7, the effective wavelength around non-linear element part 5 for a millimeter wave of 100 GHz is approximately 1 mm and the minimum inner diameter of the periodical antenna is 20 microns, the periodical antenna is designed so that it has a sensitivity at a frequency of 100 GHz or more.

The size of non-linear element part 5 is approximately 3 microns in width and approximately 10 microns in length and is very small. This signifies that non-linear element part 5 is sufficiently smaller than 250 microns which is an effective wavelength equal to one forth the wavelength of 100 GHz. Even if a plurality of oxide high temperature superconductive Josephson junction devices is included in this small region for a millimeter wave of 100 GHz, all junctions can operate with a uniform phase of electric waves. Further, non-linear element part 5 is located at the center of the log-periodical pattern. In other words, an antenna portion which responds with a higher sensitivity to a high frequency is located nearer to non-linear element part 5. As a result, a surface wave leak, which is produced from high frequency electric waves after they are received by the antenna until they are transmitted to non-linear element part 5, can be minimized for all frequencies.

An embodiment of an array antenna structure, wherein a plurality of unit patterns of the embodiment shown in FIGS. 1 to 3 described above are arrayed, is shown in FIG.4. In the embodiment shown in FIG. 4, three same unit patterns are arrayed linearly in order to simplify the description and facilitate understanding of the subject matter of the present invention. Antenna pattern part 2 is increased to three antenna pattern parts 2*a* to 2*c*, and the IF output pattern portions are increased to three times denoted by IF output pattern parts 3*a* to 3*f*. The current bias patterns are made common also with the three antenna pattern portions in order to facilitate the description and are denoted by current bias pattern parts 4*a* to 4*d*.

Figure 4:
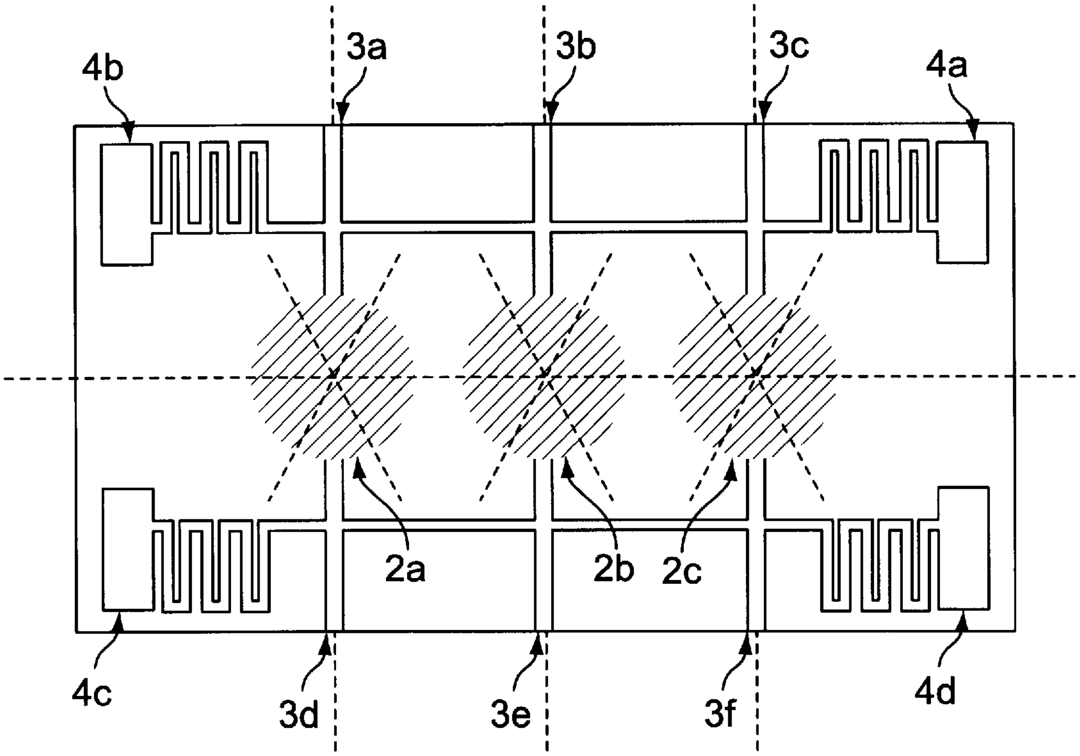
FIG. 4 is a plan view showing an example wherein an array antenna structure of the present invention is employed.

What should be noted first in designing of such an array antenna structure as shown in FIG. 4 is an array pitch of repeat antenna patterns of one unit. From the point of view of improving the directivity of the antenna by employing the arrangement of an array, the array pitch of repeat antenna patterns must be smaller than the wavelength of the electric wave in vacuum. Where the object upper limit frequency in this instance is set to 100 GHz, the maximum pitch length is approximately 3 mm. In this instance, if it is intended that the distance between the outer circumferences of unit antennae be substantially equal to the dimension of the outer circumference of a unit antenna, then the maximum outer radius mentioned hereinabove with reference to FIG. 2 must be smaller than 3.6 mm where a MgO substrate of the same material is used. It is effective that the maximum outer radius of the unit antennae be equal to or smaller than approximately 750 microns. In this instance, the limit sensitive frequency on the low frequency side is approximately 62 GHz, and accordingly, the lower limit frequency increases remarkably.

A countermeasure for decreasing the lower limit frequency while the upper limit frequency is 100 GHz is discussed here. One of the countermeasures is to increase the dielectric constant of the substrate to further make the effective wavelength of the electric wave on the surface of the substrate shorter than that in vacuum. For example, the dielectric constant of an LaAlO3 substrate, which is used frequently for formation of an oxide high temperature superconductor thin film similarly to a MgO substrate, is approximately 25. Where a LaAlO3 substrate is employed, even where the maximum outer radium of the unit antennae is set to approximately 750 microns, the limit sensitive frequency on the low frequency side can be decreased to approximately 40 GHz.

Where a substrate having a high dielectric constant is employed, the thickness of the substrate must be set smaller, but in this instance, an increase in surface wave loss may possibly occur. However, as described hereinabove with, reference to FIG. 3, non-linear element part 5 is located at the center of the log-periodical pattern, and an antenna portion which responds with a higher sensitivity to a high frequency is located nearer to non-linear element part 5. As a result, the array antenna structure can minimize a surface wave leak, which is produced from high frequency electric waves after they are received by the antenna until they are transmitted to non-linear element part 5, for all frequencies.

In particular, as the dielectric constant of the substrate increases, an antenna part which responds with a high sensitivity to a high frequency approaches non-linear element part 5, and as a result, a surface wave leak which is produced from high frequency electric waves while they are transmitted to non-linear element part 5 after they are received by the antenna does not increase very much.

As a result, with the wide frequency band high temperature superconductor mixer antenna of the present invention, the wide band performance increases as the substrate dielectric constant increases. Naturally, a material which has a low dielectric loss must be used, and where the minimum inner radius is equal, the upper limit frequency decreases as the dielectric constant of the substrate increases.

Where the minimum inner radius is 20 microns and the dielectric constant of the substrate is 9.7 as described hereinabove with reference to FIG. 3, the wide frequency band high temperature superconductor mixer antenna can have a sensitivity even up to a frequency proximate to terahertz, and, in order to set the upper limit frequency to 100 GHz with the geometrical structure just described, the dielectric constant may be 100, 200 or more.

If the wide frequency band high temperature superconductor mixer antenna of the present invention is used only as an antenna mixer whose operation is restricted to a basic wave mixer operation of an ordinary narrow frequency band, then the attention to the lower limit frequency described above need not be paid. However, the plan antenna of the log-periodical type and the log-spiral type adopted in the present invention which can be designed without paying much attention to the upper limit frequency is very effective for a millimeter wave of a frequency in the proximity of 100 GHz because a dispersion in center frequency which appears in the process of production can be permitted.

Figure 5:
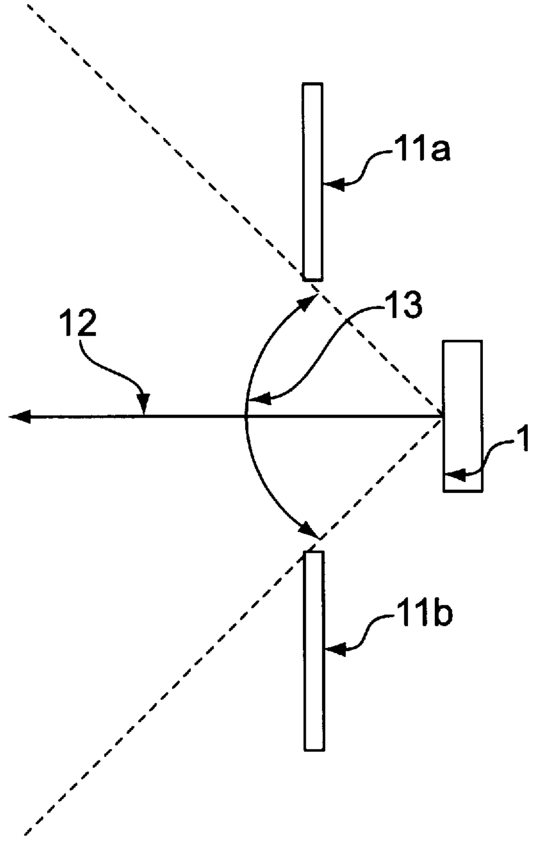
FIG. 5 is a side elevational view showing an example wherein the RF incident angle is limited in the embodiment of e present invention.

FIG. 5 is a diagrammatic view showing a schematic construction of an embodiment for moderating the limitation regarding the pitch dimension of the unit antenna patterns described hereinabove with reference to FIG. 4. FIG. 5 is an appearance view of the substrate main surface as viewed from a side.

An antenna structure having such an arrangement as shown in FIG. 4 is provided on substrate main surface 1. The principal reason why the limitation regarding the pitch dimension of the unit antenna patterns is moderated resides in that it is desired to obtain an antenna sensitivity pattern concentrated in normal line direction 12 with respect to the substrate main surface. However, RF incidence from a large antenna sensitivity direction which appears when the pitch dimension of the unit antenna patterns is designed from the wavelength of the incidence electric wave in vacuum as seen in FIG. 4 can be intercepted by electric wave shielding plates 11*a* and 11*b*. For example, if the pitch dimension of the unit antenna patterns is equal to the wavelength of the electric wave in vacuum, then an unnecessary antenna sensitivity pattern of an equal intensity to that in normal line direction 12 with respect to the substrate main surface appears in a direction parallel to the substrate main surface. However, the unnecessary antenna sensitivity pattern can be cut by such electric wave shielding plates 11*a* and 11*b* as shown in FIG. 5.

Figure 6:
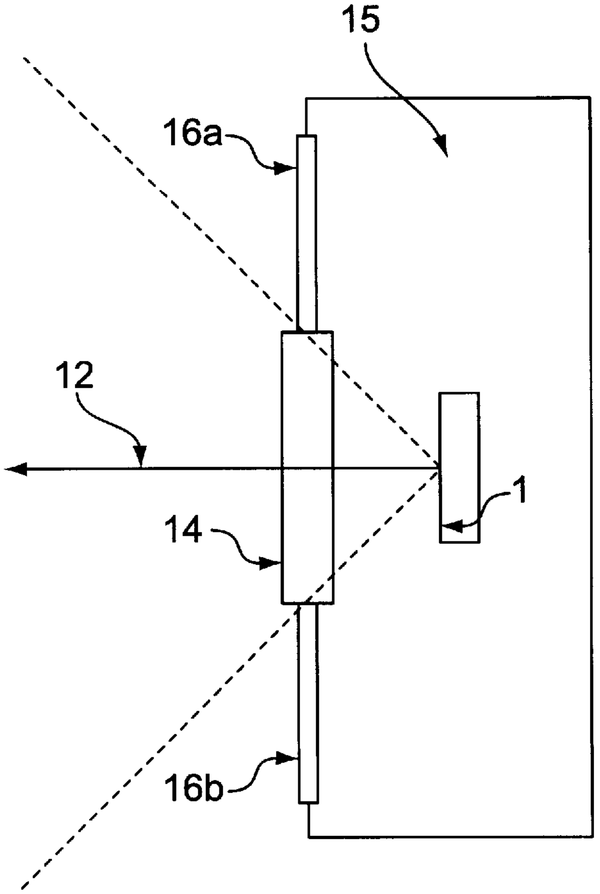
FIG. 6 is a concept diagram showing an example wherein the embodiment of the present invention is incorporated in a refrigerator.

A device which uses an oxide high temperature superconductor material is placed in a refrigerator which employs a vacuum vessel whose operating temperature can be lowered to approximately 77° K. In this instance, transparent window 14 is used for such electric waves as seen in FIG. 6. The role of electric wave shielding plates 11*a* and 11*b* of FIG. 4 is played in a natural fashion by window support plates 16*a* and 16*b* attached to vacuum vessel 15 of FIG. 6.

Next, an embodiment of the present invention for introducing a local reference frequency electric wave (LO) to a non-linear element is described.

Figure 7:
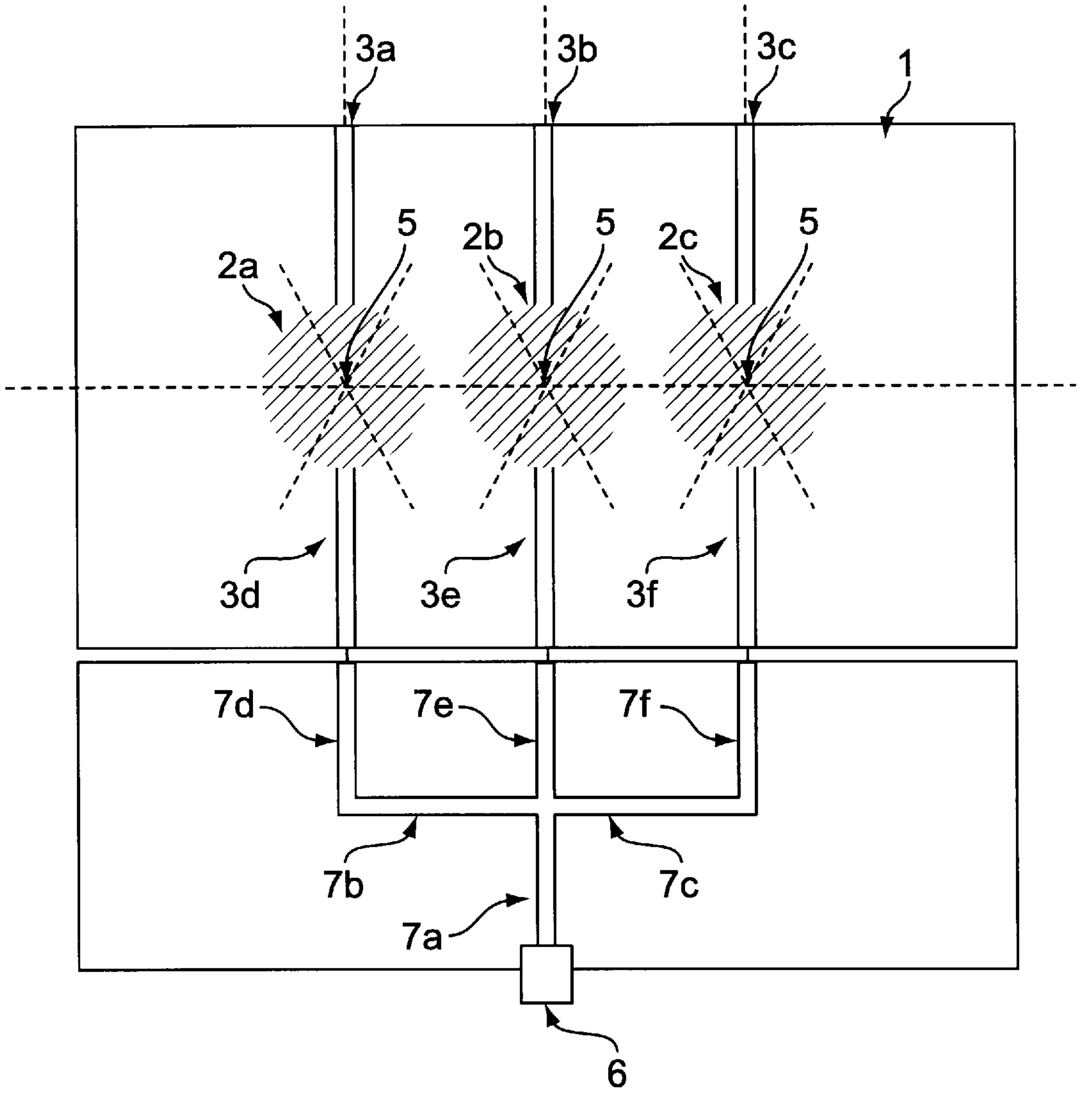
FIG. 7 is a diagrammatic view showing a comparative example of the present invention when a LO is introduced into a non-linear element part located at the center of an antenna pattern.

First, a problem encountered where non-linear element parts 5 are arranged in an array as seen in FIG. 7 is described.

In particular, this is a case wherein non-linear element parts 5 are arranged at the centers as in antenna pattern parts 2*a*, 2*b* and 2*c* as seen in an upper part of FIG. 7. A lower part of FIG. 7 shows a LO input pattern for a LO introduction method, which has been performed conventionally and is described below.

Although, in FIG. 7, LO input pattern part 7 looks as if it is separate from substrate main surface 1, even if LO input pattern part 7 is included in substrate main surface 1, there is no difference in essence. In this comparative example, the LO input pattern part serves also as part of IF output pattern parts 3.

A LO admitted in from LO input terminal 6 passes LO input pattern parts 7*a*, 7*b* and 7*d* and IF output pattern part 3*d* and is introduced into non-linear element part 5 located at the center of antenna pattern part 2*a*. Similarly, the LO is introduced into non-linear element part 5 located at the center of antenna pattern part 2*b* past LO input pattern parts 7*a* and 7*e* and IF output pattern part 3*e*, and is introduced into non-linear element part 5 located at the center of antenna pattern part 2*c* past LO input pattern parts 7*a*, 7*c* and 7*f* and IF output pattern part 3*f*. Those passages are called passages a, b and c, respectively, in this order. The lengths of the passages a, b and c are relatively different by 7 *b* or 7*c*. If the length of LO input pattern part 7 *b* or 7 *c* is set to a value equal to an integral number of times the effective wavelength of the LO, then LOs having the same phase can be introduced into three non-linear element parts 5 located at the centers of antenna pattern parts 2.

If it is intended to vary the LO frequency with the comparative example left in this state, then as far as it is required to introduce LOs of the same phase into three non-linear element parts 5 located at the centers of antenna pattern parts 2, the LO frequency to be varied must be equal to an integer of times or one nth, wherein n is a suitable integer, the initially designed LO frequency. For example, a forth-order harmonic mixer operation wherein the RF frequency is 101 GHz and the LO frequency is 25 GHz while the IF frequency is 1 GHz is presumed. The other usable LO frequency is, for example, 100 GHz, 50 GHz or 12.5 GHz, and in an ordinary planar circuit, only 12.5 GHz is available in designing. To transmit a high frequency of 100 GHz or 50 GHz by means of a plane circuit of a long distance is inferior to transmission of a lower frequency of 12.5 GHz or 25 GHz in terms of the time required for designing and the cost. Where a large number of antenna pattern parts 2 are arrayed, the difficulty increases progressively.

Figure 8:
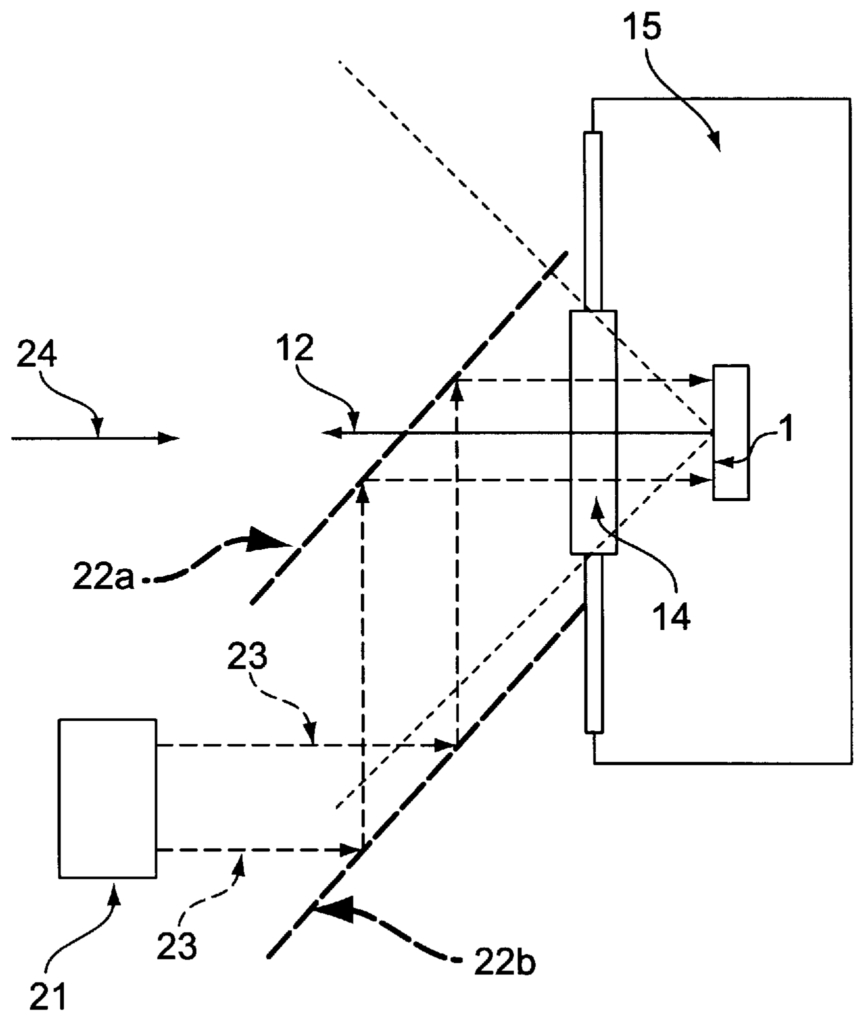
FIG. 8 a schematic structural diagram showing an example wherein a LO is supplied as radio waves to an antenna in the embodiment of the present invention.

An embodiment of the present invention which solves the problem of the comparative example of FIG. 2 is described with reference to FIG. 8. The embodiment shown in FIG. 8 makes use of the embodiment shown in FIG. 6.

LO electric waves 23 radiated from LO electric wave radiation antenna 21 are irradiated upon substrate main surface 1 by two LO electric wave reflection plates 22*a* and 22*b*. The LO electric waves are irradiated in the same phase upon a plurality of unit antenna pattern parts provided on substrate main surface 1. In the present embodiment wherein the non-linear element parts are provided at the centers of the unit antenna patterns, the local reference frequencies of the same phase are supplied to the plurality of non-linear element parts.

For LO electric wave reflection plates 22, making use of the fact that the LO frequency and the RF frequency are different from each other, a member which reflects LO electric waves well and passes RF electric waves well therethrough, such as, for example, a metal mesh or a dielectric film is used. Where LO electric wave radiation antenna 21 can be set at a location spaced away from substrate main surface 1, LO electric waves can be radiated directly from LO electric wave radiation antenna 21 to substrate main surface 1 without provision of LO electric wave reflection plates 22. Electric waves which are transmitted in the air or vacuum have a wavelength longer by several times than that of electric waves which are transmitted along the surface of the dielectric substrate, and the LO electric waves are irradiated in an almost same phase upon the plurality of unit antenna pattern parts provided on substrate main surface 1.

With the method described above, the LO frequency can be varied continuously, which is difficult with the arrangement of FIG. 7. This is because it is required to take notice only of LO electric wave radiation antenna 21 and LO electric wave reflection plates 22. In the following, an example of an experiment conducted for the embodiment device of FIG. 1 wherein a single unit antenna is provided on substrate main surface 1 with the conceptive construction of FIG. 8 is described.

The RF frequency was 100 GHz, and the LO frequency was varied to 99 GHz, 99/4 GHz (24.75 GHz), 99/5 GHz (19.8 GHz), 99/6 GHz (16.5 GHz) and 99/7 GHz (14.14 GHz). The IF frequency was fixed to a value around 1 GHz for almost all of the LO frequencies. Experiment data regarding the LO frequency (GHz) and the S/N ratio (dB) of the IF output then are such as listed in Table 1 below:

TABLE 1

| Lo frequency (GHz) | IF output S/N (dB) |
|---|---|
| 99 | 45 |
| 24.75 | 44 |
| 19.8 | 40 |
| 16.5 | 40 |
| 14.14 | 40 |

The S/N of the IF output can be further increased by decreasing the noise level of the IF amplifier. The irradiation intensity of LO electric waves was set so that all frequencies exhibit a substantially equal intensity at input portions of the LO electric wave radiation antenna. A different antenna was used only for the LO frequency of 99 GHz. The RF output was set so as to be equal for all LO frequencies. Since the same IF amplifiers for 1 GHz were used, this experimental result indicates that the device can operate with the LO frequency ranging from 99 GHz to 14.14 GHz, and signifies that S/N values of the IF output which are substantially equal to each other are obtained. Further, the experimental result indicates that, in principle, a substantially equal IF output SIN can be obtained with the RF of 100 GHz with continuous LO frequencies from 99 GHz to 14.14 GHz. This signifies that the wide frequency band high temperature superconductor mixer antenna of the present invention can operate in the frequency range from 100 GHz to 14.14 GHz. For example, even by another experiment conducted in similar experimental conditions while the RF frequency was 22 GHz and the LO frequency was 21 GHz, the IF output S/N was obtained with a substantially similar S/N output of 45 dB.

While the present invention is described in detail above in connection with the embodiments thereof, the present invention is not limited to the specific embodiments described above, but many changes and modifications can naturally be made thereto without departing from the spirit and scope of the invention.

For example, while, in the embodiments described above, MgO is used for the crystal substrate, the material is not limited to MgO, and any of SrTi3, NdGaO3, LaAlO3 or LaGaO3 or mixed crystal may be used instead. Further, while it is described in the embodiments above that the substrate has a YBaCuO film thereon, a NbBaCuO film may be provided instead.

The following effects can be achieved by representative forms of the present invention:

(1) Since the wide frequency band high temperature superconductor mixer antenna is constructed such that a unit pattern, wherein a unit wiring pattern formed from a superconductor thin film wiring pattern is provided on a same face of a main surface of a substrate, and a non-linear element part is formed inside of the unit wiring pattern, while an antenna pattern part, which radiates or absorbs a high frequency electromagnetic field, and a signal transmission line (feed line) pattern part are connected to terminals of the non-linear element part, is connected and introduced by one or a plurality of signal transmission line patterns to a signal detector and the antenna pattern part has a plane structure of the log-periodical type or the log-spiral type so that the antenna pattern part can absorb both a signal high frequency electric wave. (RF) and a local reference frequency electric wave (LO), the transmission line (feed line) pattern for the local reference frequency electric wave (LO) is not provided on the same face of the main face of the substrate. Consequently, except the antenna pattern part and a linear element part on the main surface of the substrate, high frequency line patterns for the signal high frequency (RF) and the local reference frequency (LO) need not be provided, which not only assures effective utilization of the space but also reduces the requirement for designing the line for the intermediate frequency (IF) and a current introduction terminal, that is, for designing of circuits of frequencies lower than several GHz or dc circuits.

(2) Since the superconductive non-linear element is employed, the upper limit to the RF frequency is several hundreds GHz.

(3) Since the antenna of the log-periodical type or the log-spiral type is used, the wide frequency band high temperature superconductor mixer antenna can operate in a wide band over an overall region from the upper limit frequency to the lower limit frequency. In particular, the lower limit frequency of the antenna of the type specified-relies upon an allowable maximum size of the unit antenna pattern which occupies the main surface of the substrate. The upper limit frequency depends upon a surface wave leak rather than the size of a minimum pattern of the antenna pattern part. The structure of the present invention, wherein the non-linear element part is provided adjacent to a part of a small size of the log-periodical type or the log-spiral type, can suppress the surface wave leak to the minimum level and allows an upper limit operation frequency of several hundreds GHz.

(4) Since the LO can be radiated as an electric wave at an angle close to the right angle with respect to the main surface of the substrate through the air or vacuum, even where a plurality of non-linear element parts are located discretely on the main surface of the substrate, the LO can be sent to the non-linear element parts in comparatively uniform phases compared with those where LO lines are provided on the same face of the main surface of the substrate alternatively.

(5) Since the dielectric constant of the substrate is higher than 1, the signal wavelength in the LO lines provided on the same face of the main surface of the substrate is shorter than that in the air or vacuum, and this is more advantageous in sending the LO to the non-linear element parts.

(6) Since electric waves can be introduced to the non-linear element part continuously from microwaves to sub millimeter waves and a LO radiation element can be designed in a spatially independent fashion, the wide frequency band high temperature superconductor mixer antenna of the present invention can operate as a basic wave mixer or a harmonic mixer for an RF frequency of any region from microwaves to submillimeter waves by changing only the LO frequency without changing the positions or the sizes of a plurality of antennae or non-linear element parts provided on the main surface of the substrate.

What is claimed is:

1. A wide frequency band high temperature superconductor mixer antenna having a unit wiring pattern formed from a superconductor thin film wiring pattern on a main surface of a substrate and comprising:

a non-linear element part formed inside said unit wiring pattern;

an antenna pattern part which radiates or absorbs a high frequency electromagnetic fields; and a signal transmission line pattern part, wherein said antenna pattern part and said signal transmission line pattern part are connected to terminals of said non-linear element part, said unit wiring pattern is connected by one or a plurality of signal transmission line patterns to a signal detector, said antenna pattern part has a plane structure of the log-periodical type or the log-spiral type and has, at a central portion thereof, said non-linear element part, said antenna pattern part absorbs both a signal high frequency electric wave and a local reference frequency electric wave, and the transmission line pattern for the local reference frequency electric wave is not provided on said main surface of said substrate.

2. The wide frequency band high temperature superconductor mixer antenna as claimed in claim 1, wherein the signal high frequency electric wave and the local reference frequency electric wave are both absorbed by said antenna pattern part and mixed by said non-linear element part, and an intermediate frequency signal is introduced to the signal transmission line pattern part.

3. The wide frequency band high temperature superconductor mixer antenna as claimed in claim 2, wherein said non-linear element part includes a plurality of non-linear elements connected in series and has an impedance higher than that of a single one of the non-linear elements.

4. The wide frequency band high temperature superconductor mixer antenna as claimed in claim 3, wherein said non-linear element part is smaller than one fourth of an effective wavelength of the signal high frequency electric wave and the local reference frequency electric wave on said main surface of said substrate.

5. The wide frequency band high temperature superconductor mixer antenna as claimed in claim 4, further comprising a current introduction terminal disposed on said main surface of said substrate and electrically connected to said non-linear element part, wherein each of said non-linear elements or said non-linear element part functions as a current bias controlling mixer.

6. The wide frequency band high temperature superconductor mixer antenna as claimed in claim 3, further comprising a current introduction terminal disposed on said main surface of said substrate and electrically connected to said non-linear element part, wherein each of said non-linear elements or said non-linear element part functions as a current bias controlling mixer.

7. The wide frequency band high temperature superconductor mixer antenna as claimed in claim 2, wherein said non-linear element part is smaller than one fourth of an effective wavelength of the signal high frequency electric wave and the local reference frequency electric wave on said main surface of said substrate.

8. The wide frequency band high temperature superconductor mixer antenna as claimed in claim 7, further comprising a current introduction terminal disposed on said main surface of said substrate and electrically connected to said non-linear element part, wherein said non-linear element part functions as a current bias controlling mixer.

9. The wide frequency band high temperature superconductor mixer antenna as claimed in claim 2, further comprising a current introduction terminal disposed on said main surface of said substrate and electrically connected to said non-linear element part, wherein said non-linear element part functions as a current bias controlling mixer.

10. The wide frequency band high temperature superconductor mixer antenna as claimed in claim 1, wherein said non-linear element part includes a plurality of non-linear elements connected in series and has an impedance higher than that of a single one of the non-linear elements.

11. The wide frequency band high temperature superconductor mixer antenna as claimed in claim 10, wherein said non-linear element part is smaller than one fourth of an effective wavelength of the signal high frequency electric wave and the local reference frequency electric wave on said main surface of said substrate.

12. The wide frequency band high temperature superconductor mixer antenna as claimed in claim 11, further comprising a current introduction terminal disposed on said main surface of said substrate and electrically connected to said non-linear element part, wherein each of said non-linear elements or said non-linear element part functions as a current bias controlling mixer.

13. The wide frequency band high temperature superconductor mixer antenna as claimed in claim 10, further comprising a current introduction terminal disposed on said main surface of said substrate and electrically connected to said non-linear element part, wherein each of said non-linear elements or said non-linear element part functions as a current bias controlling mixer.

14. The wide frequency band high temperature superconductor mixer antenna as claimed in claim 1, wherein said non-linear element part is smaller than one fourth of an effective wavelength of the signal high frequency electric wave and the local reference frequency electric wave on said main surface of said substrate.

15. The wide frequency band high temperature superconductor mixer antenna as claimed in claim 14, further comprising a current introduction terminal disposed on said main surface of said substrate and electrically connected to said non-linear element part, wherein said non-linear element part functions as a current bias controlling mixer.

16. The wide frequency band high temperature superconductor mixer antenna as claimed in claim 1, further comprising a current introduction terminal disposed on said main surface of said substrate and electrically connected to said non-linear element part, wherein said non-linear element part functions as a current bias controlling mixer.

17. The wide frequency band high temperature superconductor mixer antenna as claimed in any one of claims 1 to 5, wherein the superconductor thin film wiring pattern is an oxide superconductor made of a YBaCuO compound or a NbBaCuO compound.

18. The wide frequency band high temperature superconductor mixer antenna as claimed in any one of claims 1 to 5, wherein the superconductor thin film wiring pattern except for a portion where the non-linear element part is disposed, has a multiple layer film structure including a superconductor thin film and a chargeable conductive metal thin film disposed respectively from a location where said superconductor thin film pattern entirely or partly contacts with said main surface of said substrate.

* * * * *